US012598613B2

(12) United States Patent
Yang et al.

(10) Patent No.: US 12,598,613 B2
(45) Date of Patent: Apr. 7, 2026

(54) UPLINK SIGNAL TRANSMISSION METHOD, TERMINAL, AND STORAGE MEDIUM

(71) Applicant: CHINA TELECOM CORPORATION LIMITED, Beijing (CN)

(72) Inventors: Shan Yang, Beijing (CN); Xin Zhang, Beijing (CN); Congjie Mao, Beijing (CN); Jianchi Zhu, Beijing (CN); Bo Liu, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/857,135

(22) PCT Filed: May 17, 2023

(86) PCT No.: PCT/CN2023/094745
§ 371 (c)(1),
(2) Date: Oct. 15, 2024

(87) PCT Pub. No.: WO2023/231773
PCT Pub. Date: Dec. 7, 2023

(65) Prior Publication Data
US 2025/0267665 A1      Aug. 21, 2025

(30) Foreign Application Priority Data
Jun. 1, 2022      (CN) .......................... 202210616507.4

(51) Int. Cl.
*H04W 72/21*          (2023.01)
*H04L 5/00*           (2006.01)

(52) U.S. Cl.
CPC ........... *H04W 72/21* (2023.01); *H04L 5/0035* (2013.01); *H04L 5/0098* (2013.01)

(58) Field of Classification Search
CPC ..... H04W 72/21; H04L 5/0035; H04L 5/0098
See application file for complete search history.

(56) References Cited

U.S. PATENT DOCUMENTS

2012/0281550 A1      11/2012  Huang
2023/0232395 A1*      7/2023  Karmoose ............. H04W 76/20
(Continued)

FOREIGN PATENT DOCUMENTS

CN          101699913 A      4/2010
CN          102595590 A      7/2012
(Continued)

OTHER PUBLICATIONS

International Search Report issued on Aug. 15, 2023 in Application No. PCT /CN2023/094745 24 pages.
(Continued)

*Primary Examiner* — Justin Y Lee
(74) *Attorney, Agent, or Firm* — Andrew M. Calderon; Calderon Safran & Wright P.C.

(57) ABSTRACT

The present disclosure relates to the field of wireless communication, and provides an uplink signal transmission method, a terminal, and a storage medium. The terminal is configured with at least three bands and transmits an uplink signal on one or two of the at least three bands configured for the terminal.

17 Claims, 2 Drawing Sheets a terminal is configured with at least three bands

110 the terminal transmits UL signal(s) on one or two of the at least three bands configured for the terminal

120

(56) References Cited

U.S. PATENT DOCUMENTS

| | | | |
|---|---|---|---|
| 2023/0328724 A1 | 10/2023 | Yang et al. | |
| 2025/0048409 A1* | 2/2025 | Cao ..................... | H04L 5/0053 |
| 2025/0227675 A1 | 7/2025 | Harada et al. | |

FOREIGN PATENT DOCUMENTS

| | | |
|---|---|---|
| CN | 103166676 A | 6/2013 |
| CN | 102130697 B | 5/2015 |
| CN | 106486758 | 3/2017 |
| CN | 106486758 A | 3/2017 |
| CN | 114245431 A | 3/2022 |
| CN | 115707039 A | 2/2023 |
| CN | 117042058 A | 11/2023 |
| CN | 119364449 A | 1/2025 |
| CN | 119485553 A | 2/2025 |
| WO | 2016184132 A1 | 11/2016 |
| WO | 2021081983 A1 | 5/2021 |
| WO | 2023195186 A1 | 10/2023 |

OTHER PUBLICATIONS

Nokia. "Corrections to Test Procedure of Test Case 5.2B" 3GPP TSG RAN WG5 Meeting #35 RS-071182, May 11, 2007 entire document.

Nokia. "Corrections to test procedure of test case 5.2B" 3GPP TSG RAN WG5 Meeting #35 R5-071182 Kobe, Japan, May 7-11, 2007, 6 Pages.

Written opinion of the International searching authority issued on Aug. 15, 2023 in corresponding Chinese Application No. PCT/CN2023/094745 with English Translation, 6 pages.

International search report issued on Aug. 15, 2023 in corresponding Chinese Application No. PCT/CN2023/094745 with English Translation, 5 pages.

ZTE Corporation. " Multi-band transceiver and multi-band RF signal sending and receiving method and process." with English Translation, Date of Publication May 10, 2017, 5 Pages.

Decision to Grant a Patent issued May 20, 2025 in CN Application No. 202210616507.4, 8 pages.

The Extended European Search Report dated Jun. 17, 2025 in EP Application No. 23814958.7-1206 / 4496382 PCT/CN2023094745, 9 pages.

China Office Action dated Apr. 15, 2025 in CN Application No. 202210616507.4 with English Translation, 44 pages.

Huawei, HiSilicon, "Discussion on multi-carrier UL Tx switching." 3GPP TSG-RAN WG1 Meeting #109-e R1-2203136 e-Meeting, May 9-20, 2022, 7 Pages.

Spreadtrum Communications, "Discussion on multi-carrier UL Tx switching scheme." 3GPP TSG RAN WG1 #109-e R1-2203347e-Meeting, May 9-20, 2022, 4 Pages.

Vivo, "Discussion on UL TX switching." 3GPP TSG RAN WG1 #109-e R1-2203584 e-Meeting, May 9-20, 2022, 9 Pages.

China Telecom, "Discussion on UL Tx switching across up to 3 or 4 bands." 3GPP TSG RAN WG1 #109-e, e-Meeting R1-2203665 May 9-20, 2022, 8 Pages.

Xiaomi, "Discussion on multi-carrier UL Tx switching scheme." 3GPP TSG RAN WG1 #109-e R1-2203801 e-Meeting, May 9-20, 2022, 6 Pages.

CMCC, "Discussion on multi-carrier UL Tx switching scheme." 3GPP TSG RAN WG1 #109-e R1-2204325 e-Meeting, May 9-20, 2022, 5 Pages.

NTT Docomo, Inc., "Discussion on multi-carrier UL Tx switching scheme." 3GPP TSG RAN WG1 #109-e R1-2204399 e-Meeting, May 9-20, 2022, 10 Pages.

LG Electronics, "Discussion on Multi-carrier UL Tx switching scheme." 3GPP TSG RAN WG1 #109-e R1-2204632 e-Meeting, May 9-20, 2022, 6 Pages.

MediaTek Inc., "On multi-carrier UL Tx switching scheme." 3GPP TSG RAN WG1 Meeting #109-e R1-2204724 e-Meeting, May 9-20, 2022, 4 Pages.

Ericsson, "Multi-carrier UL Tx switching." 3GPP TSG-RAN WG1 Meeting #109-e R1-2204889 e-Meeting, May 9-20, 2022, 7 Pages.

Qualcomm Incorporated, "Discussion on Rel-18 UL Tx switching." 3GPP TSG RAN WG1 #109-emeeting R1-2205052 e-Meeting, May 9-May 20, 2022, 7 pages.

CATT, "Discussion on Multi-carrier UL Tx switching scheme." 3GPP TSG RAN WG1 #109-e R1-2205137 e-Meeting, May 9-20, 2022, 9 Pages.

China Telecom et al., "CR for 38.101-1: Time mask for switching across three or four uplink bands." 3GPP TSG-RAN4 Meeting #106 R4-2300164 Athens, GR, Feb. 27-Mar. 3, 2023, 9 Pages.

Qualcomm Incorporated, "draft CR on TX Switching when UE is configured for 3 or 4 bands UL." 3GPP TSG-RAN4 Meeting #106-Bis-e R4-2305808 Online, Apr. 17-26, 2023, 9 Pages.

Japanese Office Action dated Oct. 16, 2025 in related Application No. 2024-560840, 14 pages.

Moderator (NTT DOCOMO, INC.) "Summary #4 of discussion on multi-carrier UL Tx switching scheme" 3GPP TSG RAN WG1 #109-e R1-2205589 e-Meeting, May 9-20, 2022, 17 Pages.

* cited by examiner

UPLINK SIGNAL TRANSMISSION METHOD, TERMINAL, AND STORAGE MEDIUM

CROSS-REFERENCE TO RELATED APPLICATIONS

The present disclosure is a U.S. National Stage Application under 35 U.S.C. § 371 of International Patent Application No. PCT/CN2023/094745, filed on May 17, 2023, which is based on and claims priority of Chinese application for invention No. 202210616507.4, filed on Jun. 1, 2022, the disclosure both of which are hereby incorporated into this disclosure by reference in their entirety.

TECHNICAL FIELD

This disclosure relates to the field of wireless communication, particularly to an uplink signal transmission method, a terminal, and a storage medium.

BACKGROUND

With the continued evolution of 5G networks and the re-farming of the golden low frequency bands, multiple frequency bands with low frequencies below 1 GHz, mid frequencies around 2 GHz and high frequencies above 3.5 GHz will be present in 5G NR FR (Frequency Range) 1 networks.

Currently, commercial handheld terminals only support uplink (UL) dual transmitter, and are configured with at most two frequency bands.

SUMMARY

According to one aspect of the present disclosure, there is provided an uplink signal transmission method, wherein a terminal is configured with at least three bands, and the method comprises: transmitting uplink signal(s) on one or two of the at least three bands configured for the terminal.

In some embodiments, the transmitting uplink signal(s) on one or two of the at least three bands configured for the terminal comprises: transmitting the uplink signal(s) on any one band of the at least three bands configured for the terminal, or transmitting the uplink signal(s) simultaneously on a first band and a second band of the at least three bands configured for the terminal.

In some embodiments, the first band and the second band are any two bands of the at least three bands, or are some of the two bands of the at least three bands configured for the terminal.

In some embodiments, the terminal has a single-layer data transmission capability in uplink or a two-layer data transmission capability in uplink on each of the at least three bands configured for the terminal, and has the two-layer data transmission capability in uplink on at least one of the at least three bands configured for the terminal.

In some embodiments, performing a transmitter switching across bands in a case where the terminal transmits uplink signal(s) on different bands in different times.

In some embodiments, performing a transmitter switching across bands in a case where a number of transmitter(s) on at least one uplink band of the terminal is different in different times.

In some embodiments, the terminal supports at least one of a first condition and a second condition in a case where a transmitter switching across bands is performed between a first band and a second band of the at least three bands configured for the terminal; the first condition comprises the terminal supports a switching between the first band and the second band based on a carrier aggregation; and the second condition comprises the terminal supports a switching between the first band and the second band based on a supplementary uplink.

In some embodiments, the terminal supports a third condition in a case where the terminal transmits the uplink signal(s) simultaneously on a first band and a second band of the at least three bands configured for the terminal and performs a transmitter switching across bands, wherein the third condition comprises the terminal supports a switching between the first band and the second band based on a carrier aggregation, and meets a radio frequency (RF) requirement of uplink carrier aggregation on the first band and the second band.

In some embodiments, the terminal does not need to meet a radio frequency (RF) requirement for uplink simultaneous transmission on the at least three bands configured for the terminal.

In some embodiments, a switching period of transmitter switching between a first band and a second band in a case where the at least three bands are configured for the terminal is same as a switching period of transmitter switching between the first band and the second band in a case where two bands are configured for the terminal.

In some embodiments, switching periods of transmitter switching between any two bands of the at least three bands configured for the terminal are same or different.

In some embodiments, in a case where the terminal has a two-layer data transmission capability in uplink on the first band and the second band, a same switching period to perform an uplink dual transmitter-dual transmitter switching between the first band and the second band in a case where two bands are configured for the terminal is reused as a switching period to perform a transmitter switching between the first band and the second band.

In some embodiments, in a case where the terminal has a single-layer data transmission capability in uplink on the first band and a two-layer data transmission capability in uplink on the second band, a same switching period to perform an uplink single transmitter-dual transmitter switching between the first band and the second band in the case where two bands are configured for the terminal is reused as a switching period to perform a transmitter switching between the first band and the second band.

In some embodiments, in a case where the terminal has a single-layer data transmission capability in uplink on both of the first band and the second band, a same switching period to perform an uplink single transmitter-single transmitter switching between the first band and the second band in a case where two bands are configured for the terminal is reused as a switching period to perform a transmitter switching between the first band and the second band.

In some embodiments, a switching period of transmitter switching between any two bands of the at least three bands configured for the terminal is equal to or larger than a switching period of transmitter switching between two bands configured for the terminal.

In some embodiments, switching periods of transmitter switching between any two bands of the at least three bands configured for the terminal are same or different.

In some embodiments, switching periods of transmitter switching between any two bands of the at least three bands configured for the terminal are same, each of which is a maximum value among the multiple of the switching periods of any two bands to perform transmitter switching between the two bands.

In some embodiments, an uplink transmission is not required during a switching period of transmitter switching.

In some embodiments, in a case where a first transmitter of the terminal performs switching between a first band and a second band of the at least three bands configured for the terminal, and a second transmitter is on a third band of the at least three bands configured for the terminal without switching, the terminal is capable of transmitting uplink signal(s) on the third band during the switching period of switching between the first band and the second band.

In some embodiments, in a case where a first transmitter of the terminal performs switching between a first band and a second band of the at least three bands configured for the terminal, and a second transmitter is on a third band of the at least three bands configured for the terminal without switching, the terminal does not transmit uplink signal(s) on the third band during the switching period of switching between the first band and the second band.

According to another aspect of the present disclosure, there is provided a terminal, wherein the terminal is configured with at least three bands, and the terminal comprises: a signal transmission unit configured to transmit uplink signal(s) on one or two of the at least three bands configured for the terminal.

According to another aspect of the present disclosure, there is also provided a terminal, comprising: a memory; and a processor coupled to the memory, the processor configured to perform the uplink signal transmission method described above based on instructions stored in the memory.

According to a still another aspect of the present disclosure, there is also provided a non-transitory computer readable storage medium having stored thereon computer program instructions that, when executed by a processor, implement the uplink signal transmission method described above.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Figure 1:
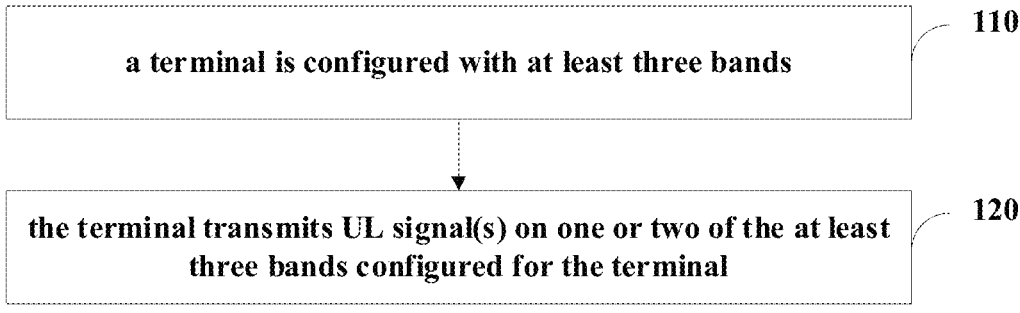
FIG. 1 is a flowchart of an uplink signal transmission method according to some embodiments of the present disclosure.

Various exemplary embodiments of the present disclosure will now be described in detail with reference to the accompanying drawings. Notice that, unless otherwise specified, the relative arrangement, numerical expressions and values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an item is defined in a drawing, there is no need for further discussion in the accompanying drawings.

For a clear understanding of the object of the present disclosure, its technical solution and advantages, the present disclosure will be further described in detail below in conjunction with the accompanying drawings and embodiments.

In related technologies, commercial handheld terminals cannot flexibly utilize all UL spectrum resources.

FIG. 1 is a flowchart of an uplink signal transmission method according to some embodiments of the present disclosure.

In step 110, a terminal is configured with at least three bands.

Due to the presence of multiple low frequencies below 1 GHz (such as 700 MHz, 800 MHz, and 900 MHz), mid frequencies around 2 GHz (1.8 GHz, 2.1 GHz), and high frequencies above 3.5 GHz in FR1 in access networks, the terminal is configured with three or more bands. For example, the terminal is configured with three UL bands: 700 MHz, 1.8 GHz, and 3.5 GHz, and each band comprises one or more component carriers.

In step 120, the terminal transmits UL signal(s) on one or two of the at least three bands configured for the terminal.

In some embodiments, the terminal transmits the UL signal(s) on any one band of the at least three bands configured for the terminal, or transmits the UL signal(s) simultaneously on a first band and a second band of the at least three bands configured for the terminal. The first band and the second band are any two bands of the at least three bands, or are some of the two bands of the at least three bands for the terminal.

For example, the terminal is configured with bands A, B and C, and supports transmission of UL signal(s) on any one band of the bands A, B and C.

For another example, the terminal supports simultaneous transmission of UL signal(s) on bands A and B, bands B and C, or bands A and C. The specific bands on which the terminal transmits UL signal(s) are scheduled by the base station, and the total number of simultaneous transmitters on the bands is less than or equal to 2.

For example, the terminal supports simultaneous transmission of UL signal(s) on bands A and B, or bands A and C, but does not support simultaneous transmission of UL signal(s) on bands B and C.

In some embodiments, the UL transmission capability of the terminal on each band comprises: the terminal has a single-layer data transmission capability in UL or a two-layer data transmission capability in UL on each of the at least three bands for the terminal, and has the two-layer data transmission capability in UL on at least one of the at least three bands configured for the terminal.

For example, the terminal has at most a single transmission capability on band A, and at most a dual transmission capability on bands B and C; or the terminal has at most a single transmission capability on bands A and B, and at most a dual transmission capability on band C.

In the above embodiment, the terminal is equipped with two transmitters that are configured with three or more bands, and supports simultaneous signal transmission on one or two bands to achieve dynamic utilization of multiple bands and improve the utilization of UL spectrum resources.

In other embodiments of the present disclosure, a transmitter (Tx) switching is performed in a case where the terminal transmits uplink signal(s) on different bands in different times. Alternatively, the Tx switching is performed in a case where the number of transmitter(s) on at least one uplink band of the terminal is different in different times.

For example, in a case where the terminal transmits UL signal(s) on band A in an earlier time and transmits UL signal(s) on band B in a later time, and two-layer data transmission are used on both bands A and B, then switching is performed for both transmitters.

For another example, a first transmitter transmits UL signal(s) on band A and a second transmitter transmits UL signal(s) on band B in the earlier time. Both the first transmitter and the second transmitter transmit UL signal(s) on band B in the later time, then switching is performed for the first transmitter.

For another example, the first transmitter transmits UL signal(s) on band A and the second transmitter transmits UL signal(s) on band C in the earlier time. both the first transmitter and the second transmitter transmit UL signal(s) on band B in the later time, then switching is performed for both transmitters.

In another example, the first transmitter transmits UL signal(s) in the earlier time and the first transmitter and the second transmitter transmit UL signal(s) simultaneously in the later time. The first transmitter is operated on band A in both times, while the second transmitter is operated on band A in the earlier time and operated on band B in the later time. Therefore, switching is only performed for the second transmitter.

For another example, the first transmitter transmits UL signal(s) on band A, and the second transmitter is operated on band A but does not transmit UL signal(s) in the earlier time. Both the first transmitter and the second transmitter transmit UL signal(s) on band B in the later time, then switching is performed for both transmitters.

In some embodiments, the terminal supports at least one of a first condition and a second condition in a case where the Tx switching across bands is performed between the first band and the second band of the at least three bands configured for the terminal; the first condition comprises the terminal supports the switching between the first band and the second band based on a carrier aggregation; and the second condition comprises the terminal supports the switching between the first band and the second band based on a supplementary uplink. That is, the terminal supports operation on these two bands and supports UL Tx switching between these two bands.

In some embodiments, the terminal supports the switching between the first band and the second band based on a carrier aggregation, and meets a radio frequency (RF) requirement of uplink carrier aggregation on the first band and the second band, in a case where the terminal transmits the uplink signal(s) simultaneously on the first band and the second band of the at least three bands configured for the terminal and performs the TX switching across bands.

In some embodiments, the terminal does not need support RF requirement for UL simultaneous transmission on the multiple bands.

In the above embodiments, in different times, if the bands for UL transmission are different or the number of transmission antennas of at least one UL transmission band is different, dynamic switching is performed for the transmitters of the terminal, and switching requirements for the corresponding fallback band pairs are defined.

In other embodiments of the present disclosure, the switching period of transmitter switching between the first band and the second band in a case where the at least three bands are configured for the terminal is same as the switching period of transmitter switching between the first band and the second band in a case where two bands are configured for the terminal.

For example, for the terminal on which bands A and B are configured, in a case where the switching period of Tx switching between bands A and B is t1 in the relevant technology, in this embodiment, for the terminal on which three UL bands A, B and C are configured, the switching period of Tx switching between bands A and B is also t1. For the terminal on which bands A and C are configured, in a case where the switching period of Tx switching between bands A and C is t2 in the relevant technology, in this embodiment, for the terminal on which three UL bands A, B and C are configured, the switching period of Tx switching between bands A and C is also t2.

In some embodiments, the Tx switching periods of Tx switching between any two bands are same or different. That is, the switching period is same or different for different band pairs. For example, the switching period of Tx switching between bands A and B is t1, and the switching period of Tx switching between bands B and C is also t1; or the switching period of Tx switching between bands A and B is t1, and the switching period of Tx switching between bands B and C is t2.

In some embodiments, in N-band switching mode, if both two bands for the switching support UL dual transmitters, then the "switching period to perform an UL dual transmitter-dual transmitter switching between these two bands in a case where these two bands are configured for the terminal" is reused. If one of the two bands for the switching supports UL single transmitter, and the other supports UL dual transmitter, then the "switching period to perform an UL single transmitter-dual transmitter switching between these two bands in a case where these two bands are configured for the terminal" is reused. If both bands for the switching support UL single transmitter, the "switching period to perform an UL single transmitter-single transmitter switching between these two bands in a case where these two bands are configured for the terminal" is reused.

In the above embodiment, by determining the Tx switching period, during the Tx switching period, the base station does not schedule UL transmission and the terminal performs UL interruption, i.e. the terminal does not transmit UL signal(s). For example, in a case where one or two transmitters of the terminal switch between two bands, the terminal dose not transmit UL signal(s) in these UL bands during the switching period.

In other embodiments of the present disclosure, the switching period of Tx switching between any two bands of the at least three bands configured for the terminal is equal to or larger than a switching period of transmitter switching between two bands configured for the terminal.

In some embodiments, the switching periods of Tx switching between any two bands of the at least three bands configured for the terminal are same or different. For example, the switching period of the terminal of switching between bands A and B and the switching period of switching between bands A and C are both t1, or the switching period of the terminal of switching between bands A and B is t1 and the switching period of switching between bands A and C is t2.

In some embodiments, the switching periods of Tx switching between any two bands of the at least three bands configured for the terminal are same, each of which is a maximum value among the multiple of the switching periods of any two bands to perform transmitter switching between the two bands.

For example, in related technologies, if the terminal is configured with bands A and B, the switching period of switching between bands A and B is t1, or if the terminal is configured with bands A and C, and the switching period of switching between bands A and C is t2, where t2>t1, then, in this disclosure, for the terminal is configured with bands A, B and C, the switching period of switching between bands A and C and the switching period of switching between bands A and B are both t2.

In the above embodiment, by determining the Tx switching period, during the Tx switching period, the base station does not schedule UL transmission and the terminal performs UL interruption. For example, if one or two transmitters of the terminal switch between two bands, the terminal dose not transmit UL signal(s) on these two bands during the switching period.

In some embodiments, in a case where the first transmitter of the terminal performs switching between two bands and the second transmitter is on a third band without switching, the terminal transmit or not transmit UL signal(s) on the third UL band during the switching period of the other two bands.

Any two bands in the above embodiment refer to any two bands that can be used for UL Tx switching.

This disclosure focuses on the actual deployment scenarios of 5G Advanced networks which, in conjunction with the capabilities of commercial handheld terminals and the current state of the 3GPP standards, can efficiently and dynamically use UL spectrum resources, thereby improving the utilization rate of spectrum resources.

Figure 2:
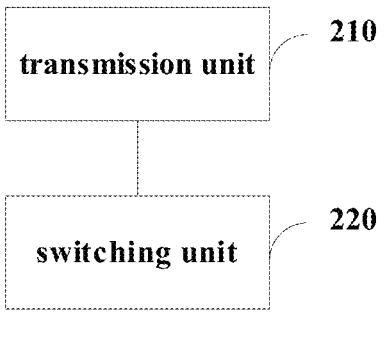
FIG. 2 is a schematic structural diagram of a terminal according to some embodiments of the present disclosure.

FIG. 2 is a schematic structural diagram of a terminal according to some embodiments of the present disclosure, the terminal is configured with at least three bands and comprising a transmission unit 210 configured to transmit UL signal(s) on one or two of the at least three bands configured for the terminal.

In some embodiments, the terminal transmits UL signal(s) on any one band of the at least three bands configured for the terminal, or transmits the UL signal(s) simultaneously on the first band and the second band of the at least three bands configured for the terminal. The first band and the second band are any two of the at least three configured frequency bands, or are some of the two bands of the at least three bands configured for the terminal.

In some embodiments, the UL transmission capability of the terminal on each band comprises: the terminal has the single-layer data transmission capability in uplink or the two-layer data transmission capability in uplink on each of the at least three bands configured for the terminal, and has the two-layer data transmission capability in uplink on at least one of the at least three bands configured for the terminal.

In the above embodiment, the terminal is configured with three or more bands, and can transmit UL signal(s) on one or two of the bands to achieve dynamic utilization of multiple bands and improve the utilization of UL spectrum resources.

In other embodiments of the present disclosure, the terminal further comprises a switching unit 220 configured to perform the Tx switching across bands in a case where the terminal transmits uplink signal(s) on different bands in different times; or perform the Tx switching across bands in a case where a number of transmitter(s) on at least one uplink band of the terminal is different in different times.

In some embodiments, the terminal supports at least one of the first condition and the second condition in a case where the transmitter switching across bands is performed between the first band and the second band of the at least three bands configured for the terminal; the first condition comprises the terminal supports the switching between the first band and the second band based on a carrier aggregation; and the second condition comprises the terminal supports the switching between the first band and the second band based on a supplementary uplink.

In some embodiments, the terminal supports the switching between the first band and the second band based on a carrier aggregation, and meets the RF requirement of uplink carrier aggregation on the first band and the second band, in a case where the terminal transmits the UL signal(s) simultaneously on the first band and the second band of the at least three bands configured for the terminal and performs the transmitter switching across bands.

In some embodiments, the terminal does not need meet the RF requirement for UL simultaneous transmission on the multiple configured bands.

In the above embodiments, in different times, if the bands for UL transmission are different or the number of transmission antennas of at least one UL transmission band is different, dynamic switching is performed for the transmitters of the terminal, and switching requirements for the corresponding fallback band pairs are defined.

In other embodiments of the present disclosure, the switching period of Tx switching between the first band and the second band in a case where the at least three bands are configured for the terminal is same as the switching period of Tx switching between the first band and the second band in a case where two bands are configured for the terminal.

In some embodiments, the switching periods of Tx switching between any two bands are same or different.

In some embodiments, in N-band switching mode, if both two bands for the switching support UL dual transmitters, then the "switching period to perform an UL dual transmitter-dual transmitter switching between these two bands in a case where these two bands are configured for the terminal" is reused. If one of the two bands for the switching supports UL single transmitter, and the other supports UL dual transmitter, then the "switching period to perform an UL single transmitter-dual transmitter switching between these two bands in a case where these two bands are configured for the terminal" is reused. If both bands for the switching support UL single transmitter, the "switching period to perform an UL single transmitter-single transmitter switching between these two bands in a case where these two bands are configured for the terminal" is reused.

In the above embodiment, by determining the Tx switching period, during the Tx switching period, the base station does not schedule UL transmission and the terminal performs UL interruption. For example, in a case where one or two transmitters of the terminal switch between two bands, the terminal does not transmit UL signal(s) on these UL bands during the switching period.

In other embodiments of the present disclosure, the switching period of Tx switching between any two bands of the at least three bands configured for the terminal is equal to or larger than the switching period of Tx switching between two bands configured for the terminal.

In some embodiments, the switching periods of Tx switching between any two bands are same or different.

In some embodiments, the switching periods of Tx switching between any two bands of the at least three bands configured for the terminal are same, each of which is a maximum value among the multiple of the switching period of any two bands to perform Tx switching between the two bands.

In the above embodiment, by determining the Tx switching period, during the Tx switching period, the base station does not schedule UL transmission and the terminal performs UL interruption. For example, in a case where one or two transmitters of the terminal switch between two bands, the terminal unit 210 does not transmit UL signal(s) on these two bands during the switching period.

In some embodiments, in a case where the first transmitter of the terminal performs switching between two bands and the second transmitter is on the third frequency band without switching, the terminal unit 210 transmit or not transmit UL signal(s) on the third UL band during the switching period of the other two bands.

Figure 3:
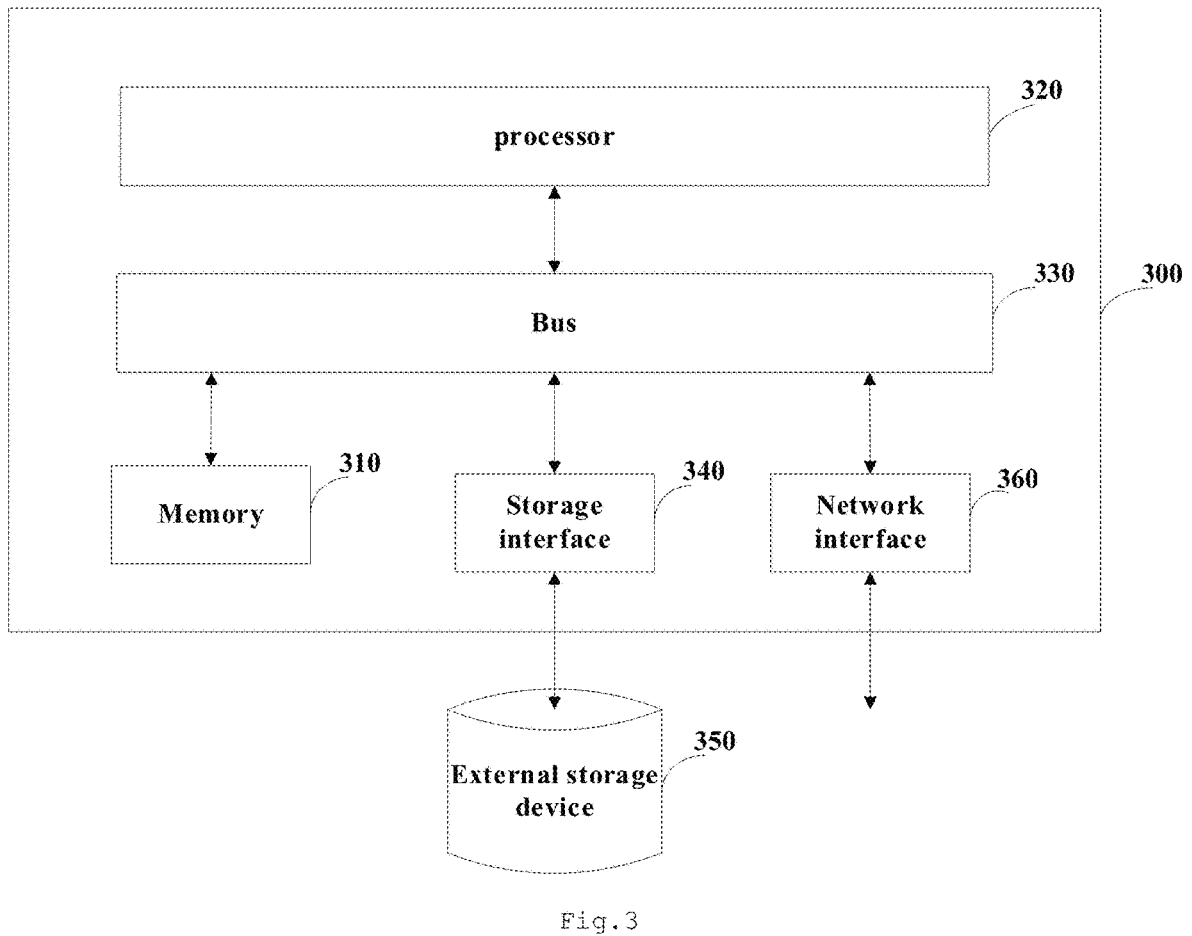
FIG. 3 is a schematic structural diagram of a terminal according to other embodiments of the present disclosure.

FIG. 3 is a schematic structural diagram of a terminal according to other embodiments of the present disclosure. The terminal 300 comprises a memory 310 and a processor 320. Wherein, the memory 310 may be a magnetic disk, flash memory or any other non-volatile storage medium. The memory is used to store instructions of a corresponding embodiment described above. The processor 320 is coupled to the memory 310 and may be implemented as one or more integrated circuits, such as a microprocessor or microcontroller. The processor 320 is configured to execute the instructions stored in the memory.

In some embodiments, the processor 320 is coupled to the memory 310 via a bus 330. The controller 300 may be further connected to an external storage device 350 through a storage interface 340 to access external data, and may be further connected to a network or another computer system (not shown) through a network interface 360, the details of which will not described herein.

In the above embodiment, through storing data instructions in memory and processing the above instructions using a processor, the utilization of spectrum resources can be improved.

In other embodiments, there is provided a computer-readable storage medium stored thereon computer program instructions that, when executed by a processor, implement the steps of the method of the above embodiment. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture including instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

According to some embodiments of the present disclosure, there is further provided a computer program, comprising: instructions that, when executed by a processor, cause the processor to execute UL signal transmission method described above.

Heretofore, the present disclosure has been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. An uplink signal transmission method, wherein a terminal is configured with at least three bands, and the uplink signal transmission method comprises:

transmitting uplink signal(s) on one band of the at least three bands configured, or transmitting the uplink signal(s) simultaneously on two bands of the at least three bands configured, wherein the terminal does not need to meet a radio frequency (RF) requirement for uplink simultaneous transmission on the at least three bands configured; and in a case where a first transmitter of the terminal performs switching between a first band and a second band of the at least three bands configured, and a second transmitter of the terminal is on a third band of the at least three bands configured and without switching, the terminal is capable of transmitting uplink signal(s) on the third band during the switching period of switching between the first band and the second band.

2. The uplink signal transmission method according to claim 1, wherein the transmitting uplink signal(s) on one or two of the at least three bands configured for the terminal comprises:

transmitting the uplink signal(s) on any one band of the at least three bands configured for the terminal, or transmitting the uplink signal(s) simultaneously on a first band and a second band of the at least three bands configured for the terminal.

3. The uplink signal transmission method according to claim 2, wherein the first band and the second band are any two bands of the at least three bands, or are some of the two bands of the at least three bands configured for the terminal.

4. The uplink signal transmission method according to claim 1, wherein the terminal has a single-layer data transmission capability in uplink or a two-layer data transmission capability in uplink on each of the at least three bands configured for the terminal, and has the two-layer data transmission capability in uplink on at least one of the at least three bands configured for the terminal.

5. The uplink signal transmission method according to claim 1, further comprising:

performing a transmitter switching across bands in a case where the terminal transmits uplink signal(s) on different bands in different times.

6. The uplink signal transmission method according to claim 1, further comprising:

performing a transmitter switching across bands in a case where a number of transmitter(s) on at least one uplink band of the terminal is different in different times.

7. The uplink signal transmission method according to claim 1, wherein:

the terminal supports at least one of a first condition and a second condition in a case where a transmitter switching across bands is performed between a first band and a second band of the at least three bands configured for the terminal;

the first condition comprises the terminal supports a switching between the first band and the second band based on a carrier aggregation; and the second condition comprises the terminal supports a switching between the first band and the second band based on a supplementary uplink.

8. The uplink signal transmission method according to claim 1, wherein:

the terminal supports a third condition in a case where the terminal transmits the uplink signal(s) simultaneously on a first band and a second band of the at least three bands configured for the terminal and performs a transmitter switching across bands; and the third condition comprises the terminal supports a switching between the first band and the second band based on a carrier aggregation, and meets a radio frequency (RF) requirement of uplink carrier aggregation on the first band and the second band.

9. The uplink signal transmission method according to claim 1, wherein a switching period of transmitter switching between a first band and a second band in a case where the at least three bands are configured for the terminal is same as a switching period of transmitter switching between the first band and the second band in a case where two bands are configured for the terminal.

10. The uplink signal transmission method according to claim 9, wherein switching periods of transmitter switching between any two bands of the at least three bands configured for the terminal are same or different.

11. The uplink signal transmission method according to claim 9, wherein in a case where the terminal has a two-layer data transmission capability in uplink on the first band and the second band, a same switching period to perform an uplink dual transmitter-dual transmitter switching between the first band and the second band in a case where two bands are configured for the terminal is reused as a switching period to perform a transmitter switching between the first band and the second band.

12. The uplink signal transmission method according to claim 9, wherein in a case where the terminal has a single-layer data transmission capability in uplink on the first band and a two-layer data transmission capability in uplink on the second band, a same switching period to perform an uplink single transmitter-dual transmitter switching between the first band and the second band in the case where two bands are configured for the terminal is reused as a switching period to perform a transmitter switching between the first band and the second band.

13. The uplink signal transmission method according to claim 9, wherein in a case where the terminal has a single-layer data transmission capability in uplink on both of the first band and the second band, a same switching period to perform an uplink single transmitter-single transmitter switching between the first band and the second band in a case where two bands are configured for the terminal is reused as a switching period to perform a transmitter switching between the first band and the second band.

14. The uplink signal transmission method according to claim 1, wherein a switching period of transmitter switching between any two bands of the at least three bands configured for the terminal is equal to or larger than a switching period of transmitter switching between two bands configured for the terminal.

15. The uplink signal transmission method according to claim 14, wherein switching periods of transmitter switching between any two bands of the at least three bands configured for the terminal are same or different; or the switching periods of transmitter switching between any two bands of the at least three bands configured for the terminal are same, each of which is a maximum value among a multiple of the switching periods of any two bands to perform transmitter switching between the two bands.

16. A terminal, comprising:

a memory; and a processor coupled to the memory, the processor configured to, based on instructions stored in the memory, carry out an uplink signal transmission method, wherein the terminal is configured with at least three bands, and the uplink signal transmission method comprises:

transmitting uplink signal(s) on one band of the at least three bands configured, or transmitting the uplink signal(s) simultaneously on two bands of the at least three bands configured, wherein the terminal does not need to meet a radio frequency (RF) requirement for uplink simultaneous transmission on the at least three bands configured; and in a case where a first transmitter of the terminal performs switching between a first band and a second band of the at least three bands configured, and a second transmitter of the terminal is on a third band of the at least three bands configured and without switching, the terminal is capable of transmitting uplink signal(s) on the third band during the switching period of switching between the first band and the second band.

17. A non-transitory computer-readable storage medium stored thereon computer program instructions that, when executed by a processor, implement an uplink signal transmission method, wherein the terminal is configured with at least three bands, and the uplink signal transmission method comprises:

transmitting uplink signal(s) on one band of the at least three bands configured, or transmitting the uplink signal(s) simultaneously on two bands of the at least three bands configured, wherein the terminal does not need to meet a radio frequency (RF) requirement for uplink simultaneous transmission on the at least three bands configured; and in a case where a first transmitter of the terminal performs switching between a first band and a second band of the at least three bands configured, and a second transmitter of the terminal is on a third band of the at least three bands configured and without switching, the terminal is capable of transmitting uplink signal(s) on the third band during the switching period of switching between the first band and the second band.

* * * * *